(12) United States Patent
Shurilla et al.

(10) Patent No.: US 12,228,114 B1
(45) Date of Patent: Feb. 18, 2025

(54) LARGE DEPLOYABLE PANEL WITH SHAPE MEMORY HINGE AND LOAD ELEMENTS

(71) Applicant: The Boeing Company, Arlington, VA (US)

(72) Inventors: Christopher R. Shurilla, Palm Desert, CA (US); Zackary L. Endsley, Wailuku, HI (US); John C. Mooney, Makawao, HI (US); Steven Fulton Griffin, Kihei, HI (US); Alexander C. Klein, Bellevue, WA (US); Frederick Theodore Calkins, Renton, WA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 18/469,599

(22) Filed: Sep. 19, 2023

Related U.S. Application Data

(60) Provisional application No. 63/519,470, filed on Aug. 14, 2023.

(51) Int. Cl.
*F03G 7/06* (2006.01)
*B64G 1/44* (2006.01)

(52) U.S. Cl.
CPC .......... *F03G 7/06145* (2021.08); *B64G 1/443* (2013.01)

(58) Field of Classification Search
CPC ...... F03G 7/06; F03G 7/0614; F03G 7/06145; F03G 7/065; B64G 1/222; B64G 1/44; B64G 1/443; B64G 1/66; B25J 9/1085; F16C 11/06–10; H01Q 1/1235
See application file for complete search history.

(56) References Cited

U.S. PATENT DOCUMENTS

| | | | |
|---|---|---|---|
| 2002/0195177 A1* | 12/2002 | Hinkley | E05F 15/60 148/645 |
| 2015/0140253 A1* | 5/2015 | Lang | F24S 20/50 428/57 |
| 2018/0142729 A1* | 5/2018 | Lee | F16F 3/02 |

* cited by examiner

*Primary Examiner* — Loren C Edwards
(74) *Attorney, Agent, or Firm* — Yee & Associates, P.C.

(57) ABSTRACT

A deployable panel is provided comprising a first subpanel, a second subpanel, and a shape memory alloy hinge connecting the subpanels. The shape memory alloy hinge enables the subpanels to move between a position in which the first and second subpanels are folded over each other and an unfolded position in response to an energy source that changes the shape of the shape memory alloy hinge, wherein the unfolded position is trained into the shape memory alloy hinge to ensure precise kinematic mating between the subpanels. Shape memory alloy springs are connected to the first subpanel and respective tethers connect the shape memory alloy springs to the second subpanel. The shape memory alloy springs contract in response to a second energy source to pull the subpanels together via the tethers when the subpanels are in the unfolded position to produce a seamless, featureless surface of the deployable panel.

15 Claims, 22 Drawing Sheets

LARGE DEPLOYABLE PANEL WITH SHAPE MEMORY HINGE AND LOAD ELEMENTS

CROSS-REFERENCE TO RELATED APPLICATION

This application claims the benefit of U.S. Provisional Patent Application Ser. No. 63/519,470, filed Aug. 14, 2023, and entitled "Large Deployable Panel with Shape Memory Hinge and Load Elements," which is incorporated herein by reference in its entirety.

BACKGROUND INFORMATION

Technical Field

The present disclosure relates generally to deployable folding panels, and more specifically to novel hinge applications utilizing memory alloy material.

Background

Large, complex panels are often deployed in space due to the requirement for large surface area on an object like a solar array or antenna and the constraint of limited space in the launch vehicle. When deployments are relatively simple and require one or two movements to deploy, many options are available for the deployment mechanism.

For more complex structures involving multiple folds often employ tendon/pulley systems or hinge/motor assemblies.

SUMMARY

An illustrative embodiment provides a deployable panel comprising a first subpanel, a second subpanel, and a shape memory alloy hinge connecting the first and second subpanels. The shape memory alloy hinge enables the first and second subpanels to move between a first position in which the first and second subpanels are folded over each other and a second, unfolded position in response to a first energy source that changes the shape of the shape memory alloy hinge, wherein the second, unfolded position is trained into the shape memory alloy hinge to ensure precise kinematic mating between the first and second subpanels. A number of shape memory alloy springs are connected to the first subpanel and a number of respective tethers connect the shape memory alloy springs to the second subpanel. The shape memory alloy springs contract in response to a second energy source to pull the first and second subpanels together via the tethers when the first and second subpanels are in the second, unfolded position to produce a seamless, featureless surface of the deployable panel.

Another illustrative embodiment provides a deployable panel comprising subpanels, shape memory alloy hinges, shape memory alloy springs, and tethers. The shape memory alloy hinges connect the subpanels together in respective pairs, wherein each subpanel is part of at least one pair, and wherein the shape memory alloy hinge enables the subpanels in each pair to move between a first position in which the subpanels are folded over each other and a second position in which the subpanels in each pair are coplanar in response to a first energy source that changes the shape of the shape memory alloy hinge. The shape memory alloy springs are connected to a first subpanel of each respective pair, and the respective tethers connect the shape memory alloy springs to the second subpanel of each respective pair. The shape memory alloy springs contract in response to a second energy source to pull the first and second subpanels together end-to-end via the tethers.

Another illustrative embodiment provides a deployable panel comprising nine subpanels arranged in grid of three rows of three. First shape memory alloy hinges connect the center subpanel of each row to the other subpanels in the row. The first shape memory alloy hinges enable the outside subpanels in each row to move between a first, folded position in which the outside subpanels are folded over the center subpanel and a second, extended position in which the subpanels are coplanar in response to a first energy source that changes the shape of the first shape memory alloy hinges. Second shape memory alloy hinges connect the center subpanel of the center row to the center subpanels of the other two rows. The second shape memory alloy hinges enable the top and middle rows of subpanels to move between a third, folded position in which the center subpanels of the top and middle rows are folded over the center subpanel of the bottom row, and a fourth, extended position in which the center subpanels of the rows are coplanar in response to a second energy source that changes the shape of the second shape memory alloy hinges.

Another illustrative embodiment provides a deployable panel comprising a number of subpanels and a number of shape memory alloy springs connecting the subpanels together. The shape memory alloy springs enable the subpanels to move between a first position in which the subpanels are folded over each other in a specified fold configuration and a second position in which the subpanels are arranged coplanar as a unitary panel. The shape memory alloy springs move the subpanels from the first position to the second position in response to an energy source that changes the shape of the shape memory alloy springs.

Another illustrative embodiment provides a deployable panel comprising a number of subpanels, a number of hinges connecting the subpanels together, and shape memory alloy springs within the hinges. The hinges enable the subpanels to move between a first position in which the subpanels are folded over each other in a specified fold configuration and a second position in which the subpanels are arranged coplanar as a unitary panel. The shape memory alloy springs apply load to the hinges to move the subpanels from the first position to the second position in response to an energy source that changes the shape of the shape memory alloy springs.

Another illustrative embodiment provides a deployable panel comprising a number of subpanels and a number of shape memory alloy springs connecting the subpanels together. The shape memory alloy springs bend to act as hinges that enable the subpanels to move between a first position in which the subpanels are folded over each other in a specified fold configuration and a second, unfolded position in which the subpanels are arranged as a unitary panel. The shape memory alloy springs move the subpanels from the first position to the second, unfolded position in response to an energy source that changes the shape of the shape memory alloy springs. The second, unfolded position is trained into the shape memory alloy springs to ensure precise kinematic mating between the subpanels when they are unfolded and pulled together.

Another illustrative embodiment provides a method of deploying a panel. The method comprises folding a first subpanel over a second subpanel, wherein the first and second subpanels are connected by a shape memory alloy hinge in a folded position. A first energy source is applied to the shape memory alloy hinge to cause the shape memory alloy hinge to straighten and unfold the first and second subpanels to an unfolded position. The unfolded position is trained into the shape memory alloy hinge to ensure precise kinematic mating between the first and second subpanels. A second energy source is applied to a number of shape memory alloy springs connect to the first subpanel, wherein the second energy source causes the shape memory alloy springs to contract and pull on tethers connected to the second subpanel to pull the first and second subpanels together after the first and second subpanels are in the unfolded position to produce a seamless, featureless surface of the panel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that large, complex panels are often deployed in space due to the requirement for large surface area on an object like a solar array or antenna and the constraint of limited space in the launch vehicle. When deployments are relatively simple and require one or two movements to deploy, many options are available for the deployment mechanism.

The illustrative embodiments recognize and take into account that when deployments get more complex and involve multiple folds, there are two, traditional options that are employed. One option comprises complex tendons/pulleys that deploy and establish the tensile part of tension/compression load path that must be reeled in or out using motors. The other option comprises hinge/motor assemblies where each motor requires communications and power interfaces and where the motor is only part of the deployment and not part of the final load path.

The illustrative embodiments provide a deployable panel assembly that employs shape memory alloy (SMA) based hinges. An SMA (e.g., nitinol) is a memory alloy that returns to an original shape when heated. Subpanels comprising the deployable panel assembly fan are initially folded over each other in a compact configuration. In response to an applied energy source such as an electric current, the SMA in the hinges returns to an original extended position, thereby unfolding and deploying the subpanels. The illustrative embodiments use an SMA such as nitinol as both a local motor as well as a tensile component part of the final load path.

Figure 1:
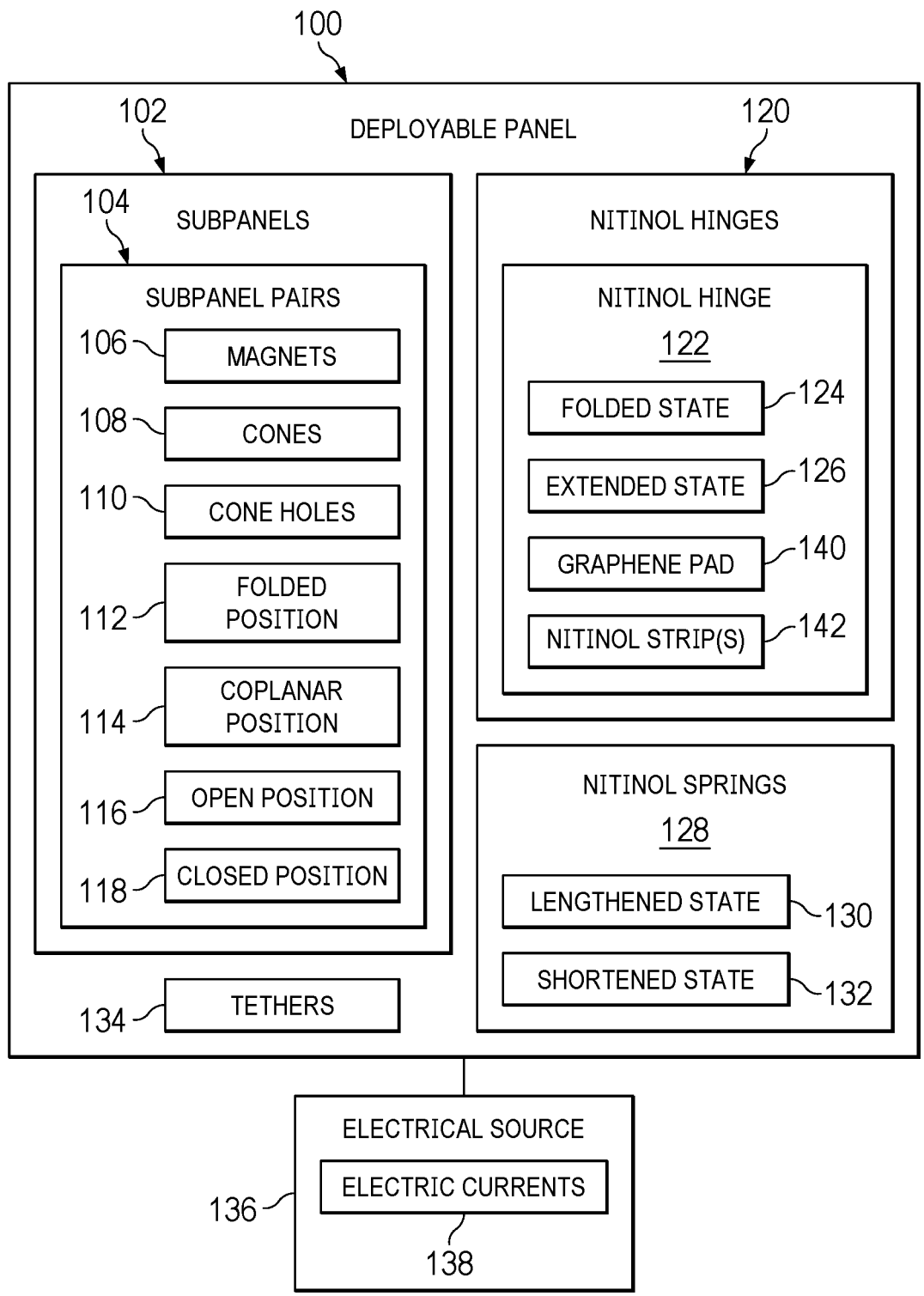
FIG. 1 is an illustration of a block diagram of a deployable panel in accordance with an illustrative embodiment.

With reference now to FIG. 1, an illustration of a block diagram of a deployable panel is depicted in accordance with an illustrative embodiment. Deployable panel 100 comprises a number of subpanels 102 that can be folded together and then unfolded into a planar array. The subpanels 102 are organized into a number respective subpanels pairs 104. Some of the subpanels 102 might belong to more than one of the subpanel pairs, but functionally, the deployable panel 100 operates with respect to subpanel pairs 104.

Deployable panel 100 is held together by a number of nitinol (or other SMA) hinges 120. The subpanels comprising each of the subpanel pairs 104 are connected by a respective nitinol hinge 122. Nitinol is a shape memory alloy made from nickel and titanium. Nitinol has the ability to move between different shapes due to reversible phase transition when heated above its transformation temperature (e.g., by an electric current). In the context of deployable panel 100, a nitinol hinge 122 might comprise a bar with an initial extended (straight) state 126 and is then bent into a folded state 124 prior to deployment. Nitinol hinge 122 might also comprise a graphene pad 140 (or other heating element) bonded to one or more nitinol strips 142. Graphene pad/heating element 140 facilitates heating the nitinol to the transformation temperature with a lower electric current. Upon application of electric currents 138 from an electric source, and resultant heating via the graphene pad/heating element 140, the nitinol in the nitinol hinge 122 "remembers" the original shape it was trained to and returns to the extended state 126 (see FIGS. 3A-3C).

The shape memory capability of the nitinol hinges 120 allows the respective subpanel pairs 102 (and by extension, all of the subpanels 102) to move between a folded position 112 to a coplanar position 114 in response to electric currents 138 (or external thermal source) applied to the nitinol hinges 120.

Each of the subpanel pairs 104 includes nitinol (or other SMA) springs 128 attached to at least one subpanel within the pair connect to the other subpanel by tethers 134. When each of the subpanel pairs 104 unfolds to the coplanar position 114 they are in an open position 116 in which the subpanels are not in direct contact with each other. In response to electric current, the nitinol springs 128, similar to the nitinol hinges 120, change shape by moving from a lengthened state 130 to a shortened state 132 and in so doing pull the subpanels on the subpanel pairs 104 together (via the tethers 134) into a closed position 118.

When the subpanels are pulled together, cone hole 110 extending from one of the subpanels in each pair fit into accommodating cone holes 110 the other subpanel to ensure alignment of the subpanels as they are being pulled together. Magnets 106 in adjacent ends of the subpanels hold the subpanels together end-to-end after they are pulled together by the nitinol springs 128 via the tethers 134.

The memory quality of the nitinol and the use of magnets allows precision preloading (training) of kinematic mating between the subpanels 102 to achieve a seamless final surface to the deployable panel 100 when in the final deployed state without surface features on the front of the panel.

Figure 2:
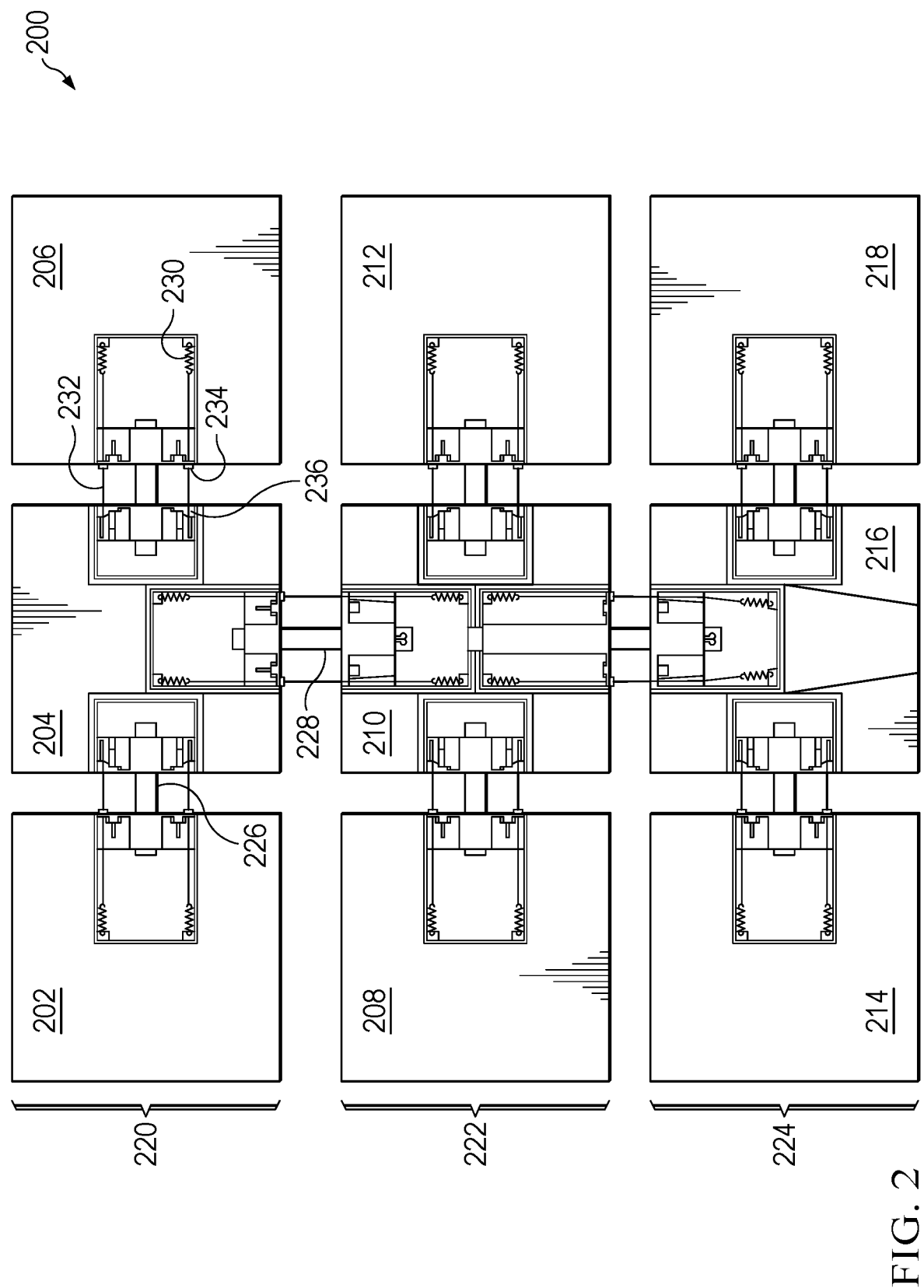
FIG. 2 depicts a pictorial diagram illustrating a deployable panel in accordance with an illustrative embodiment.

FIG. 2 depicts a pictorial diagram illustrating a deployable panel in accordance with an illustrative embodiment. Deployable panel 200 is an example implementation of deployable panel 100 in FIG. 1.

In this example, the deployable panel 200 comprises an array of nine subpanels 202-218 arranged in three rows 220, 222, 224 of three subpanels each. The center subpanels 204, 210, 216 of each row are linked to the wing subpanels in each row by SMA hinges 226, which allows the subpanels in each row to move between a first, folded position in which the outer wing subpanels (e.g., 202, 206) are folded over the center subpanel (e.g., 204) (see FIG. 4B) and a second, extended position in which the subpanels are coplanar in response to a first electric current or external thermal source that changes the shape of the SMA hinges (see FIG. 4E). The SMA hinges 226 connecting the wing subpanels 202, 206, 208, 212, 214, 218 to the center subpanels 204, 210, 216 might comprise a graphene heating pad or other heating element bonded to an SMA strip. Application of an energy source such as electric current or external thermal source to the graphene pad enables the nitinol to reach the transformation temperature with a lower current than would be required if the nitinol were used alone as a simple conductor.

The center subpanels 204, 210, 216 of each row are also connected to each other by a second group of SMA hinges 228, which enable the top and middle rows 220, 222 of subpanels to move between a folded position in which the center subpanels 204, 210 of the top and middle rows are folded over the center subpanel 216 of the bottom row (see FIG. 4A), and an extended position in which the center subpanels 204, 210, 216 of the rows are coplanar (as shown in FIG. 2) in response to a second electric current that changes the shape of the second group of SMA hinges 228. The SMA hinges 228 that connect the center subpanels 204, 210, 216 might comprise a graphene heating pad sandwiched between two SMA strips.

Once in the subpanels 202-218 are coplanar, SMA springs 230 are shortened by application of electric current, which causes them to pull the subpanels together via tethers 232. As the subpanels meet, cones 234 extending from one subpanel in each respective pair provide alignment by sliding into corresponding cone holes 236 in the other subpanel within the pair. As shown in the present example, the tethers might run through the cones 234 and cone holes 236.

FIGS. 3A through 3E depict a sequence of pictorial diagrams illustrating the deployment of a subpanel pair from a folded position to a coplanar, closed position in accordance with an illustrative embodiment. Such unfolding of two subpanels relative to each other forms the basic operational unit of more complex deployable arrays (see FIGS. 4A-4E).

Figure 3A:
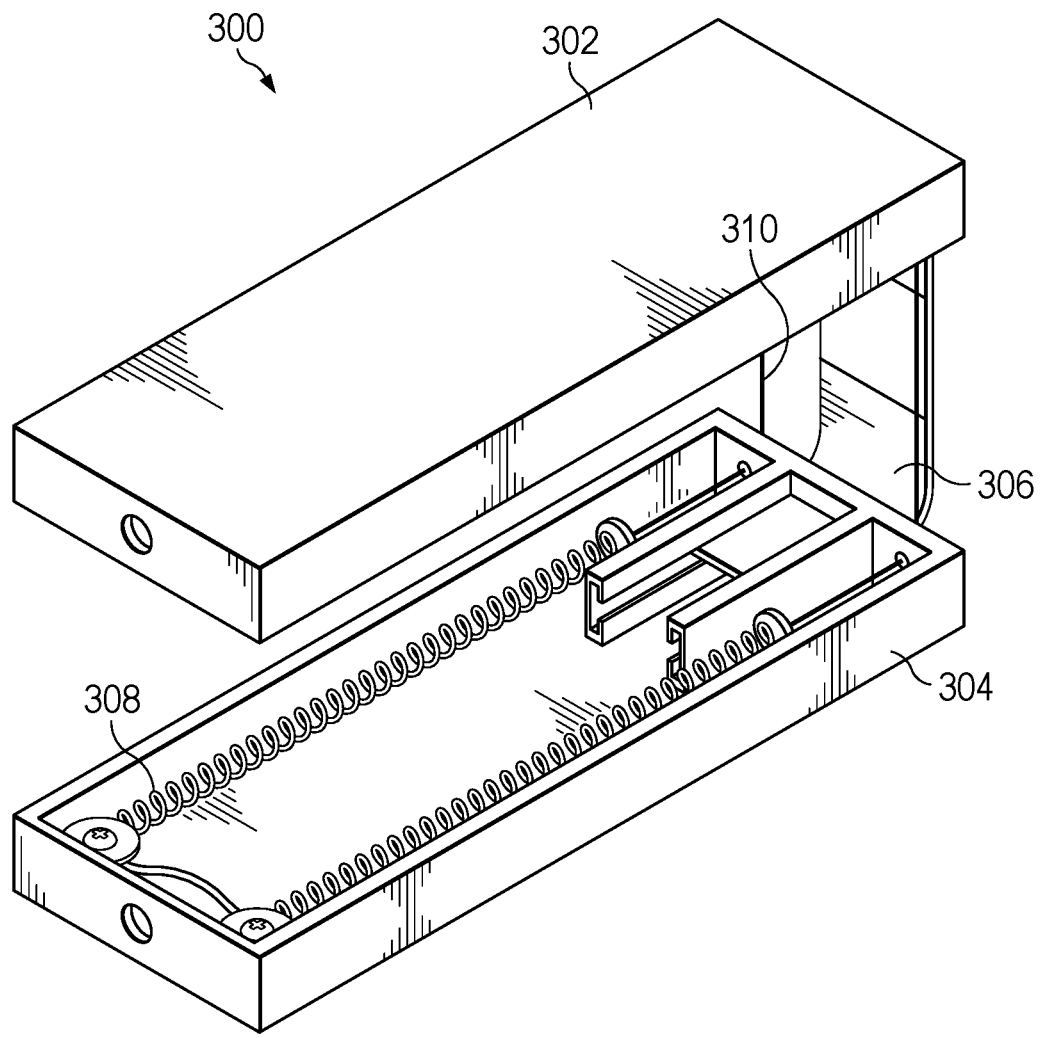
FIG. 3A depicts a pictorial diagram of two subpanels comprising a subpanel pair in a folded position in accordance with an illustrative embodiment.

FIG. 3A depicts a pictorial diagram of two subpanels 302, 304 comprising a subpanel pair 300 in a folded position. As shown, the subpanels 302, 304 are connected by a SMA hinge 306 that is in a folded position.

Figure 3B:
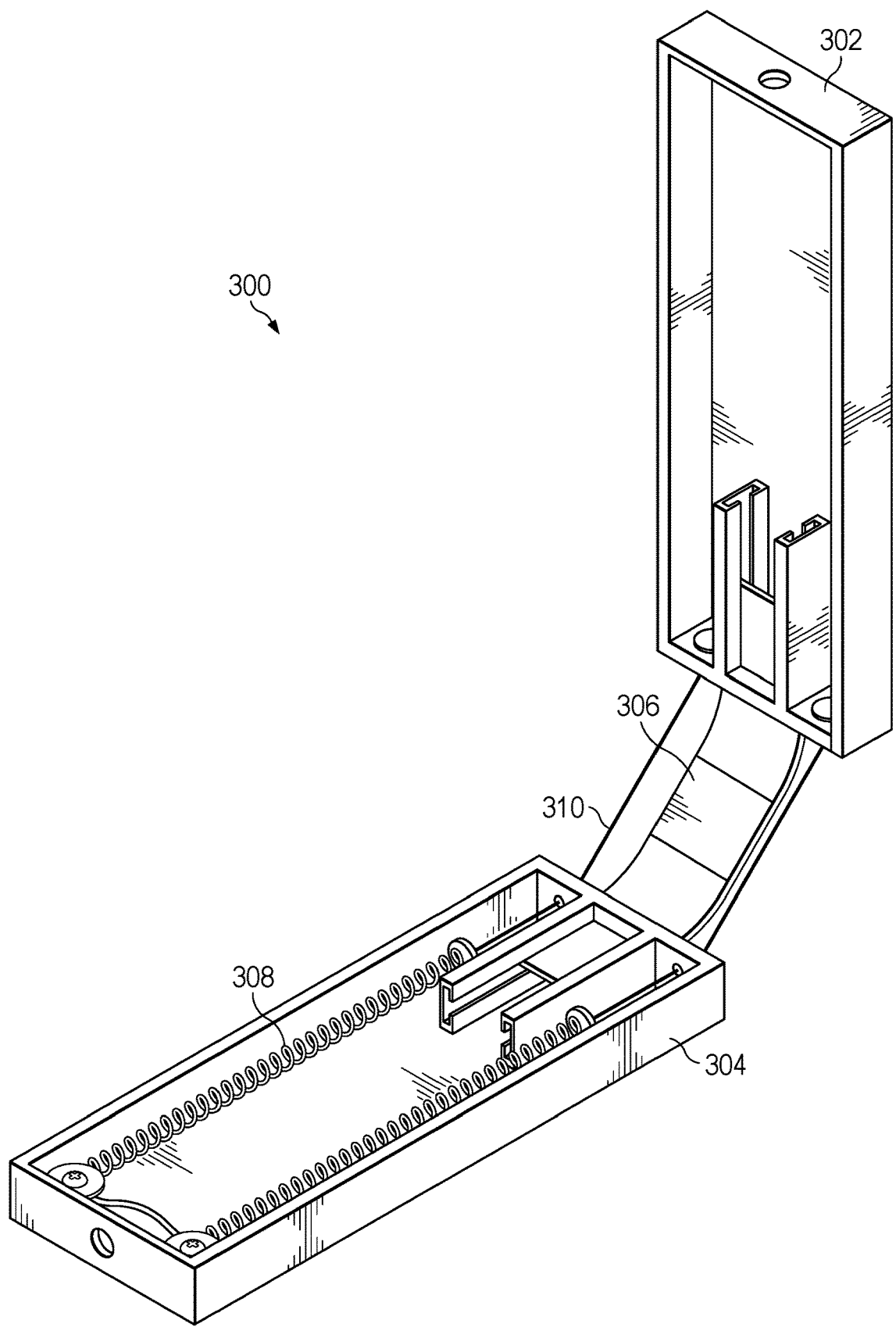
FIG. 3B depicts a pictorial diagram of the two subpanels comprising the subpanel pair in a partially unfolded position in accordance with an illustrative embodiment.

FIG. 3B depicts a pictorial diagram of the subpanels 302, 304 comprising the subpanel pair 300 in a partially unfolded position. The SMA springs 308 and tethers 310 are more visible in this view.

Figure 3C:
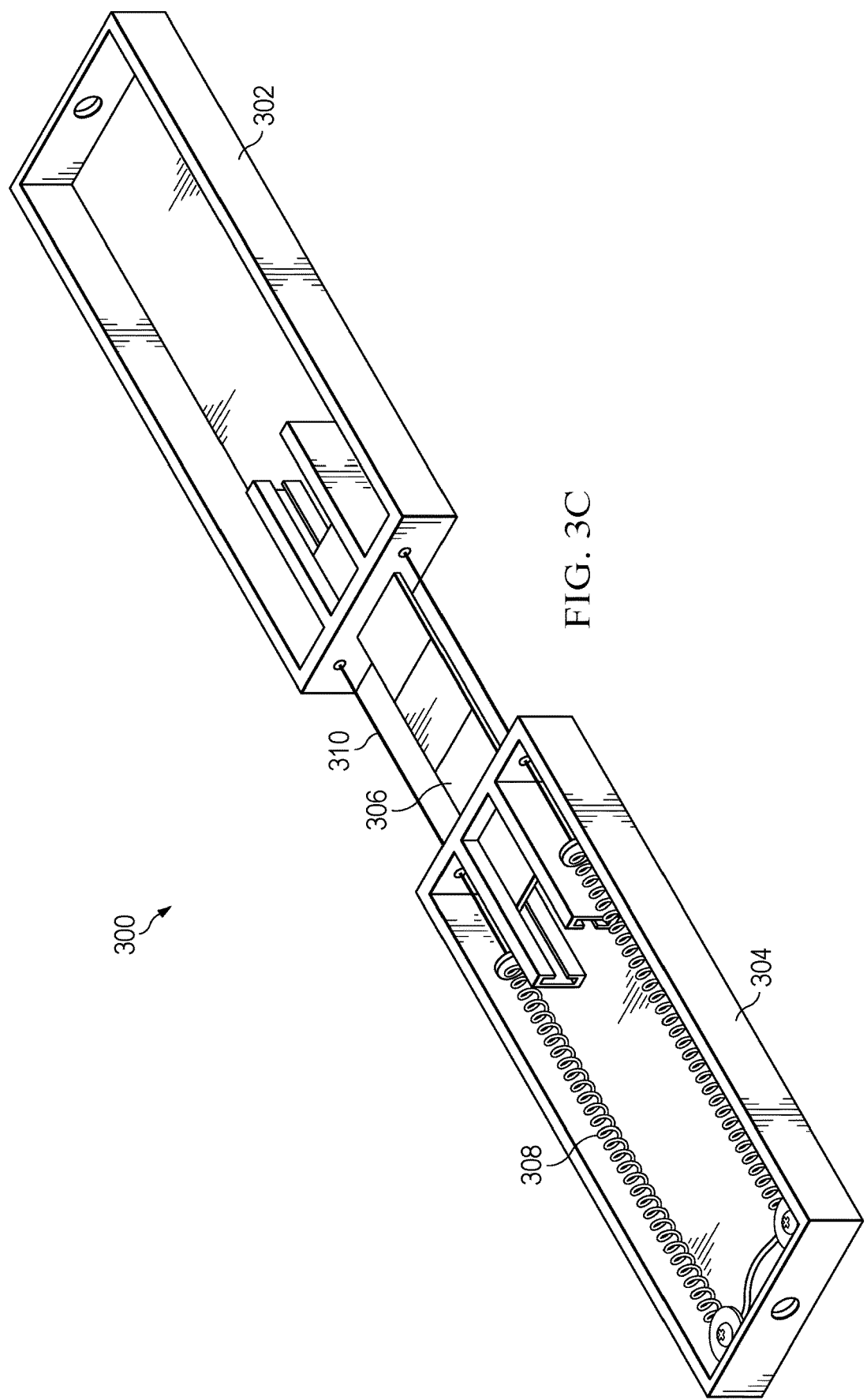
FIG. 3C depicts a pictorial diagram of the two subpanels comprising the subpanel pair in an unfolded position in accordance with an illustrative embodiment.

FIG. 3C depicts a pictorial diagram of the two subpanels 302, 304 comprising the subpanel pair 300 in an unfolded position. In this position, SMA hinge 306 is in an extended state. This unfolded position is trained into the SMA hinge 306 to ensure precise kinematic mating between the first and second subpanels 302, 304 when pulled together (see FIG. 3E).

Figure 3D:
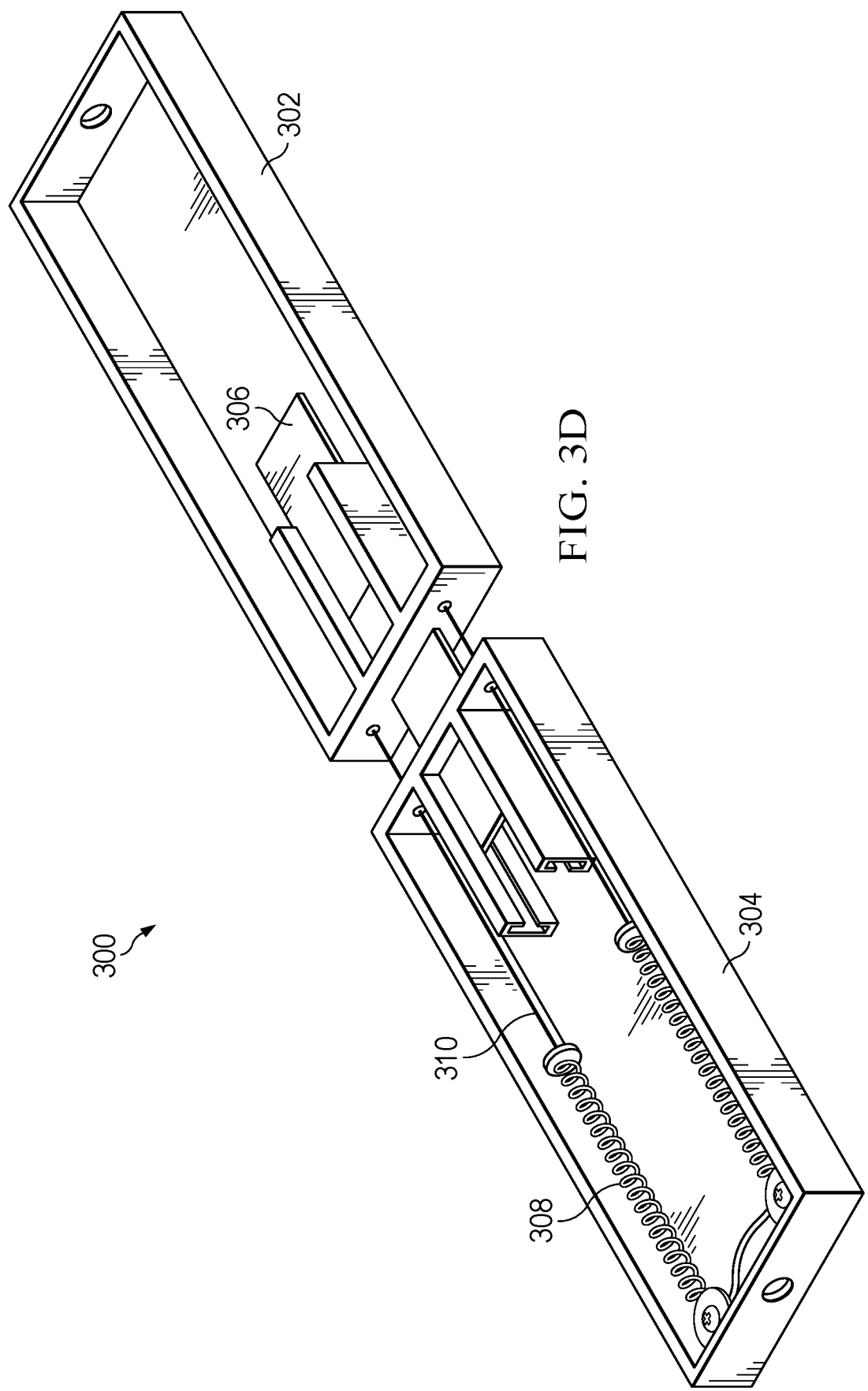
FIG. 3D depicts a pictorial diagram of the two subpanels comprising the subpanel pair partially pulled together in the unfolded position in accordance with an illustrative embodiment.

FIG. 3D depicts a pictorial diagram of the two subpanels 302, 304 comprising the subpanel pair 300 partially pulled together in the unfolded position. In response to electric current, the SMA springs 308 shorten and pull subpanels 302 and 304 together via tethers 310.

Figure 3E:
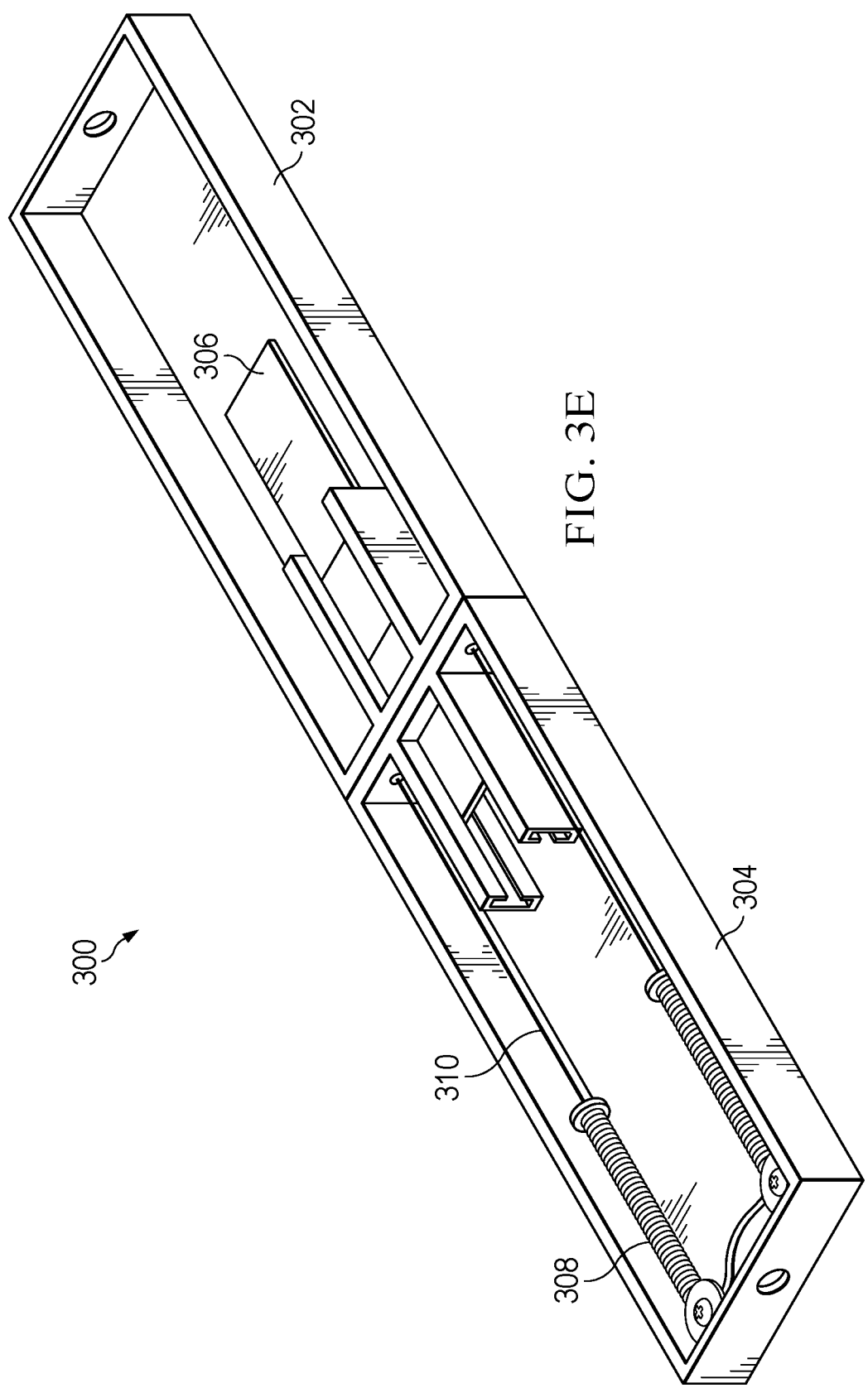
FIG. 3E depicts a pictorial diagram of the two subpanels comprising the subpanel pair pulled together in a closed, coplanar position in accordance with an illustrative embodiment.

FIG. 3E depicts a pictorial diagram of the two subpanels 302, 304 comprising the subpanel pair 300 pulled together in a closed, coplanar position.

FIGS. 4A-4D depict a sequence of pictorial diagrams illustrating the deployment of a panel array in accordance with an illustrative embodiment. In the present example, the deployable panel 400 comprises an array of nine subpanels as shown in FIG. 2 and is shown mounted to an ESPA (Evolved Expendable Launch Vehicle (EELV) Secondary Payload Adapter) ring 402.

Figure 4A:
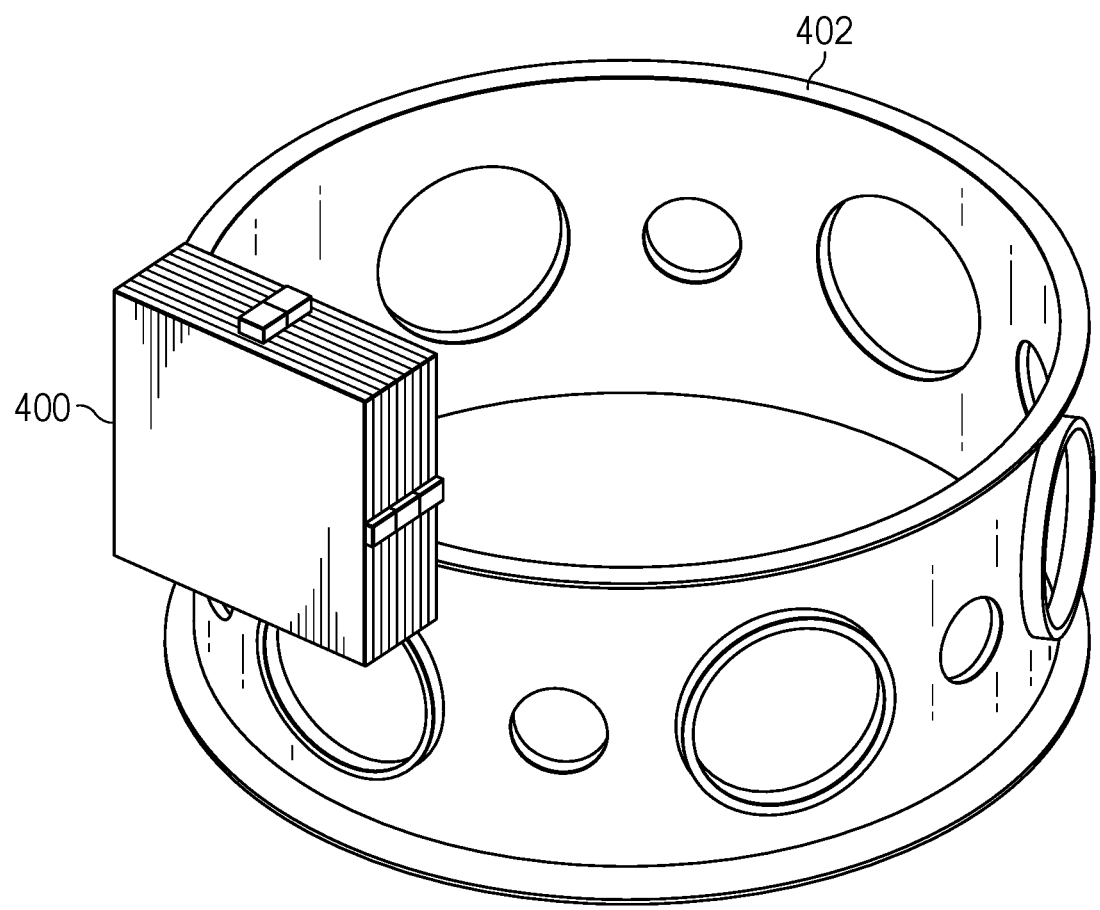
FIG. 4A depicts a pictorial diagram of a deployable panel array in a folded state in accordance with an illustrative embodiment.

FIG. 4A depicts the deployable panel array 400 in a folded state.

Figure 4B:
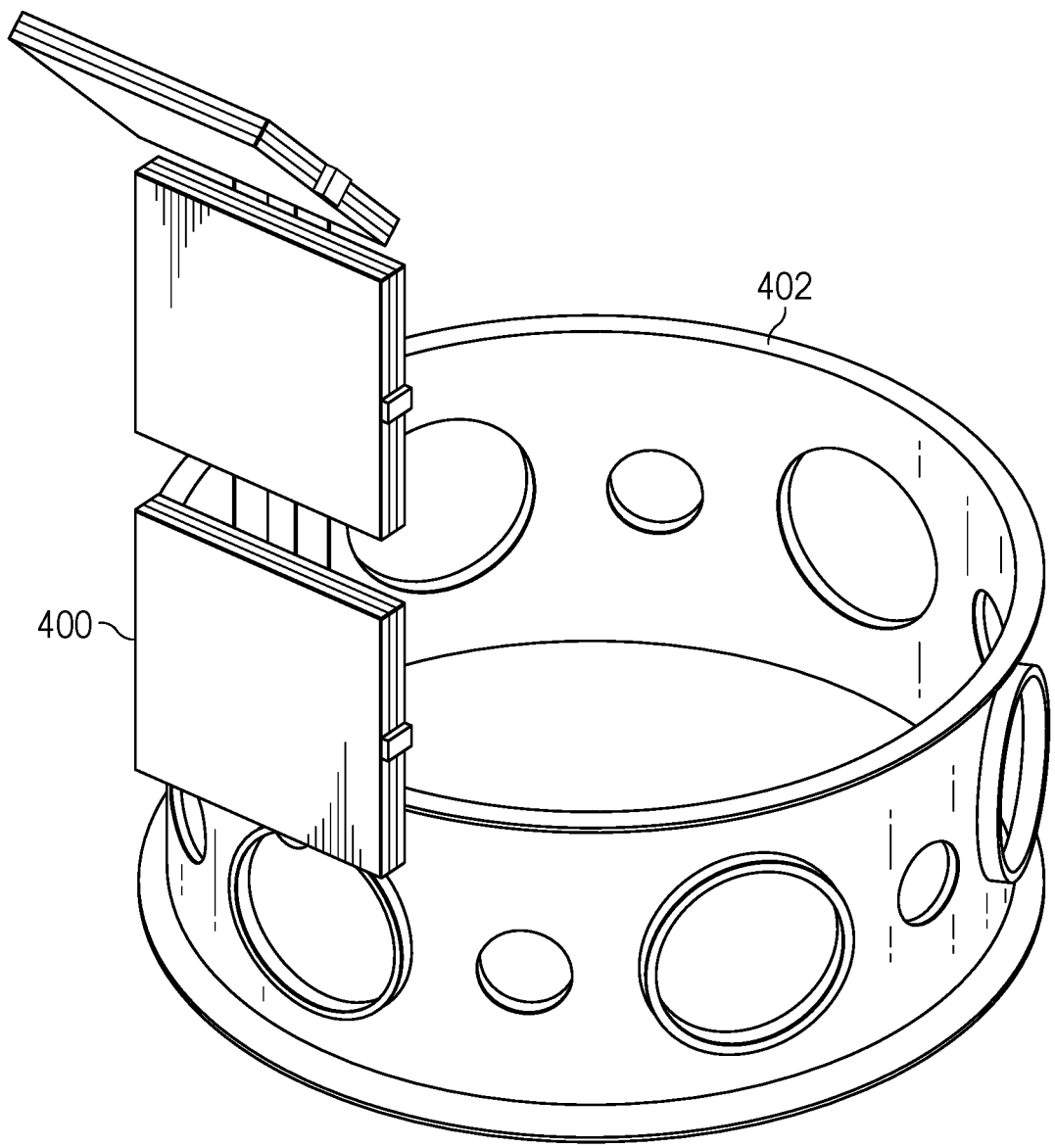
FIG. 4B depicts a pictorial diagram of the deployable panel array in a partially unfolded state along the axis of the center subpanels of each row in accordance with an illustrative embodiment.

FIG. 4B depicts the deployable panel array 400 in a partially unfolded state along the axis of the center subpanels of each row. In FIG. 4B, the center subpanels are unfolding from each other, but the lateral subpanels are still folded over the center subpanel of each row.

Figure 4C:
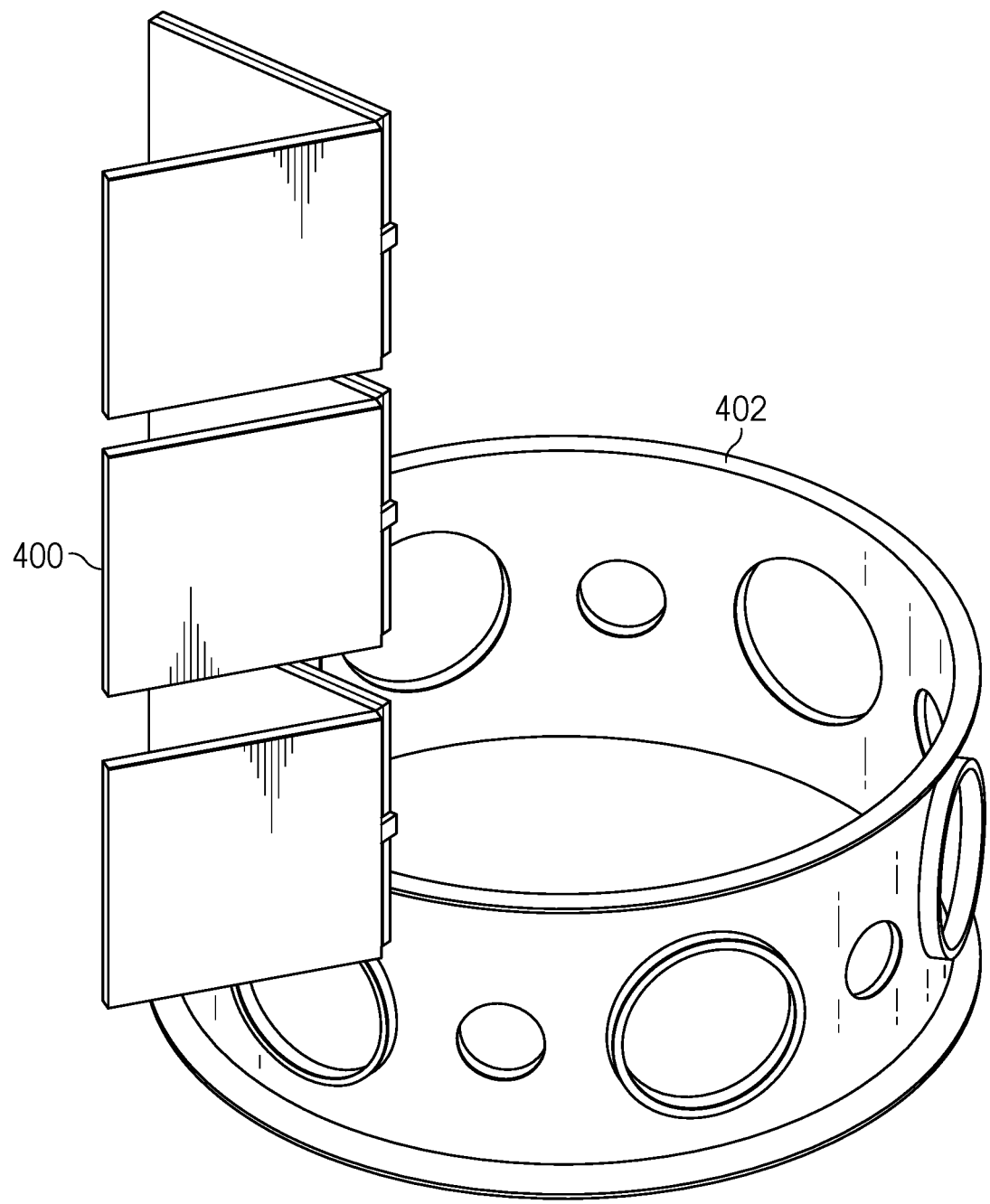
FIG. 4C depicts a pictorial diagram of the lateral subpanels of each row of the deployable panel array in a partially unfolded state in accordance with an illustrative embodiment.

FIG. 4C depicts the lateral subpanels of each row of the deployable panel array 400 in a partially unfolded state. At this stage, the center subpanels have unfolded from each other and are in a coplanar position as the lateral subpanels in each row begin to unfold from the center subpanel.

Figure 4D:
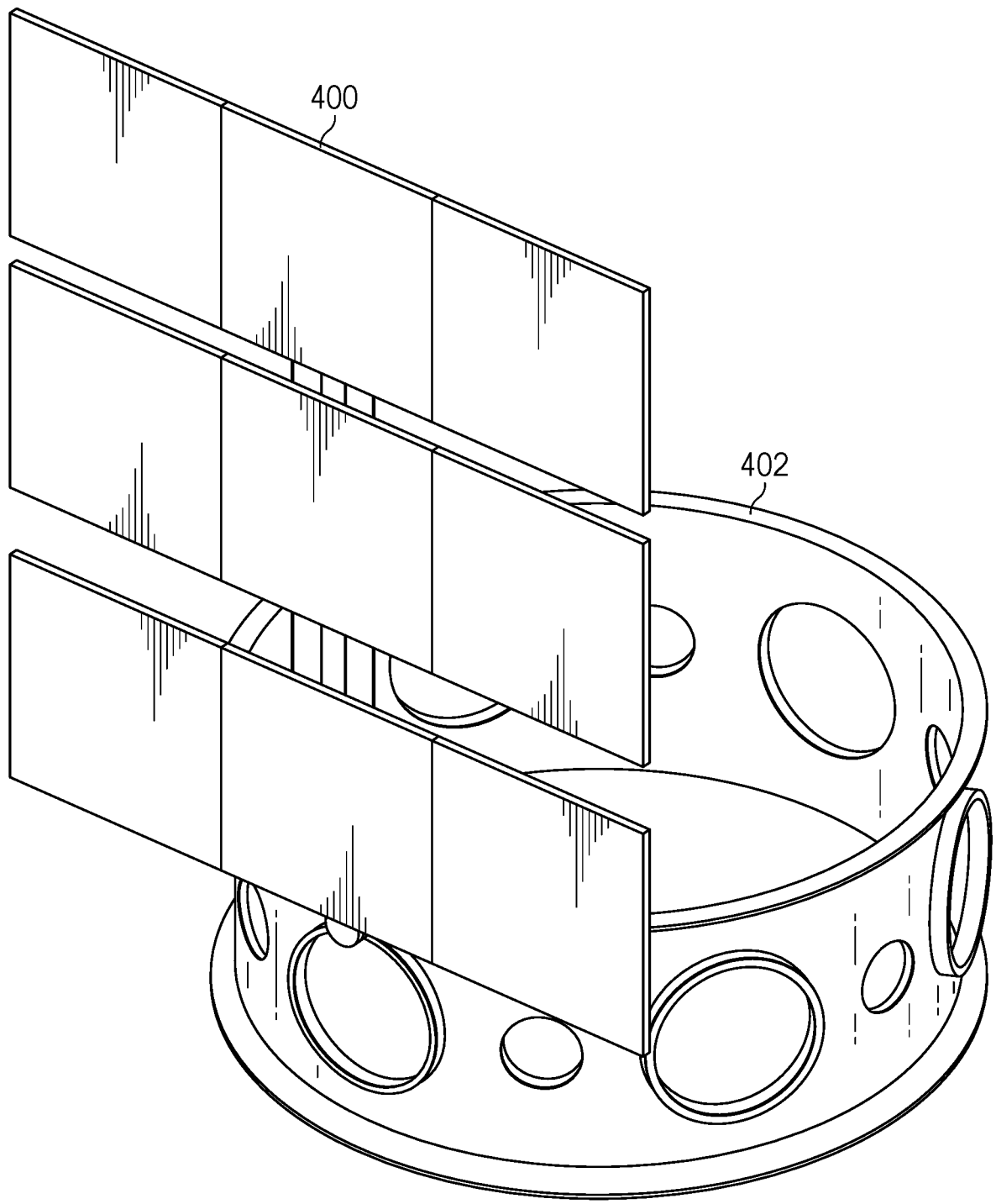
FIG. 4D depicts a pictorial diagram of the deployable panel array in an open, unfolded state in accordance with an illustrative embodiment.

FIG. 4D depicts the deployable panel array 400 in an open, unfolded state. In this state, the lateral subpanels in each row have fully deployed, and all of the subpanels are coplanar with each other, but the separate rows have not yet been pulled together.

Figure 4E:
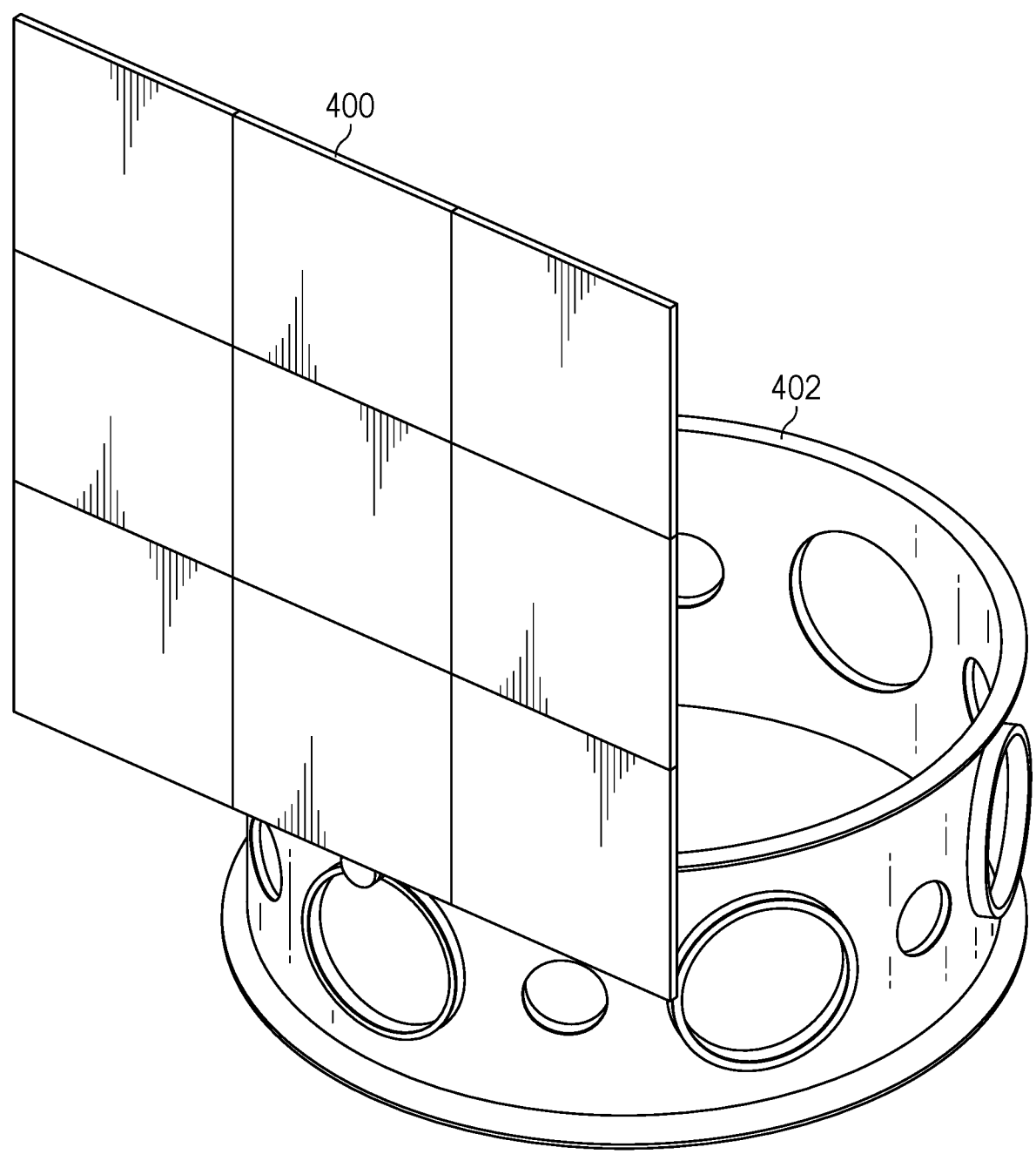
FIG. 4E depicts a pictorial diagram of the deployable panel array in a closed, unfolded state after the rows have been pulled together in accordance with an illustrative embodiment.

FIG. 4E depicts the deployable panel array 400 in a closed, unfolded state after the rows have been pulled together, resulting in a seamless, featureless surface of the deployable panel array 400.

Figure 4F:
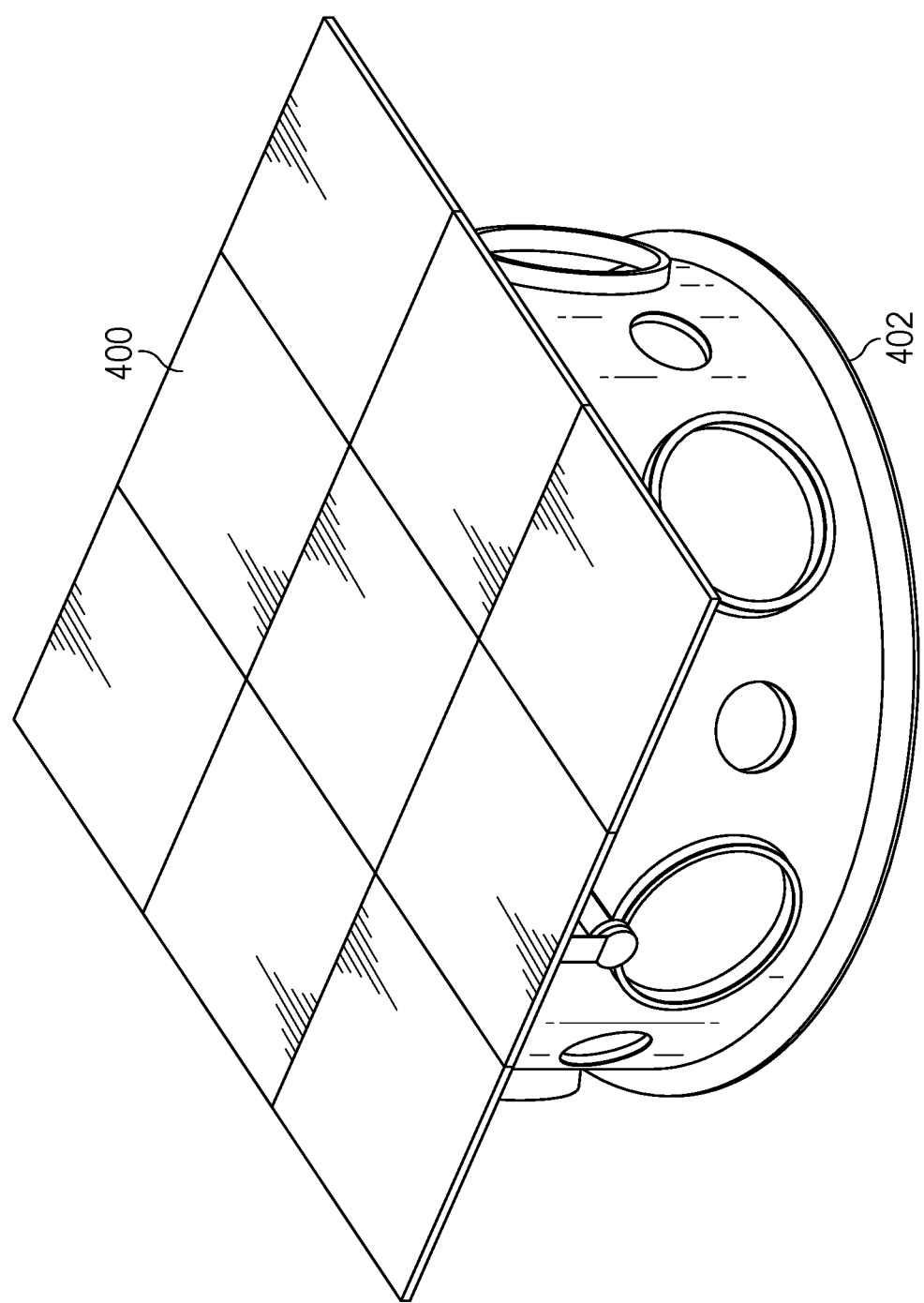
FIG. 4F depicts a pictorial diagram of the deployable panel array folded over the ESPA ring in accordance with an illustrative embodiment.

FIG. 4F depicts the deployable panel array 400 folded over the ESPA ring 402. In this position, the panel array 400 is its final operational position.

In applications such as deployment in space (e.g., on a satellite), solar radiation might provide the energy source to heat the SMA hinges to unfold and deploy the panel. Solar heating might be used as a passive nonelectrical method of deployment or as a backup in the event of electrical failure.

Figure 5:
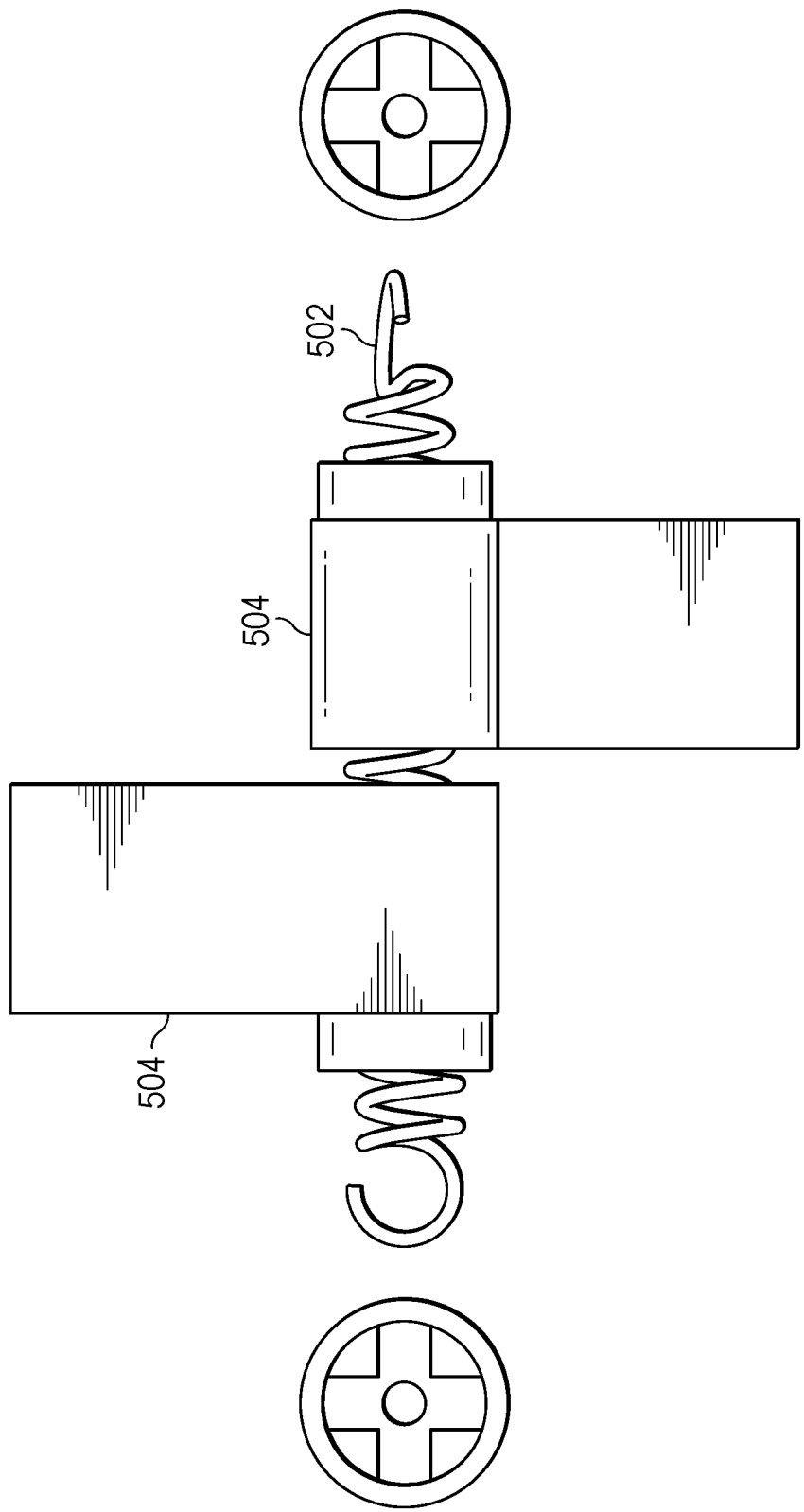
FIG. 5 depicts a pictorial diagram of a shape memory alloy spring-driven hinge in accordance with an alternate illustrative embodiment.

FIG. 5 depicts an SMA spring-driven hinge in accordance with an alternate illustrative embodiment. In this embodiment, an SMA spring 502 runs along the rotational axis of the hinge 504 comprising the hinge. The SMA spring 502 is configured to maintain a preload on the hinge and remains in the load path.

In this embodiment, the martensitic SMA spring 502 is deformed to a spring with more coils and more rotation at its ends when the hinge 504 is folded. When a current is applied, the SMA spring 502 returns to a remembered shape that has fewer coils and a smaller angle between ends, thereby rotating the hinge 504 open and maintaining load against the hinge.

Figure 6A:
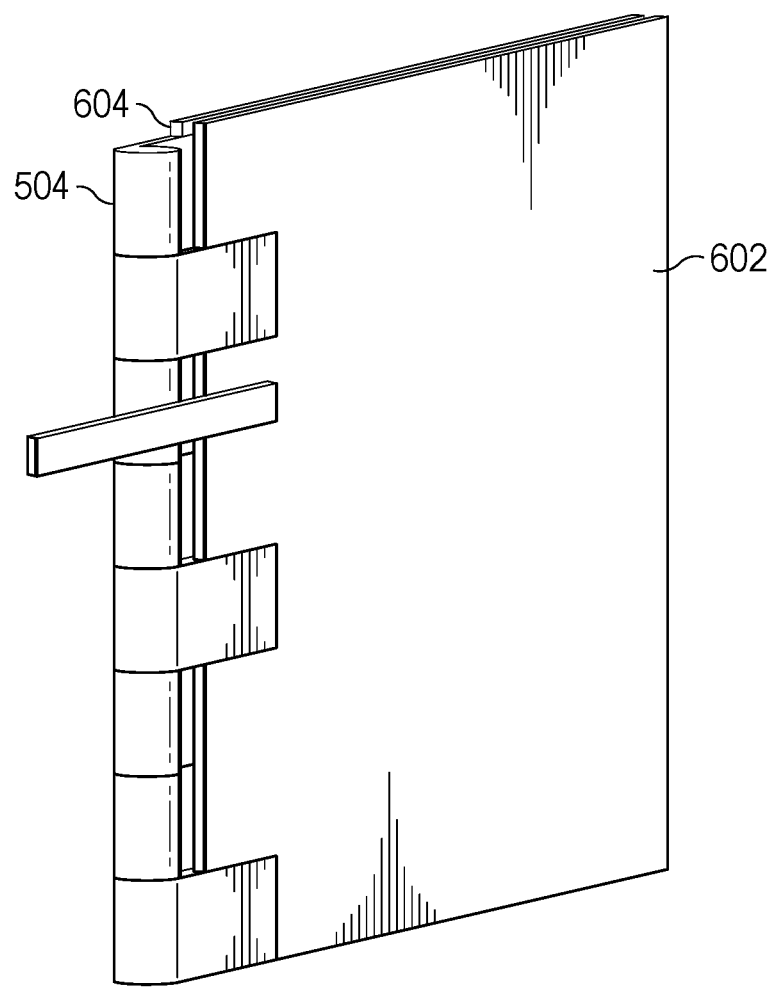
FIG. 6A depicts a pictorial diagram of three shape memory alloy spring-driven hinges connecting two panels in a folded position in accordance with an illustrative embodiment.
Figure 6B:
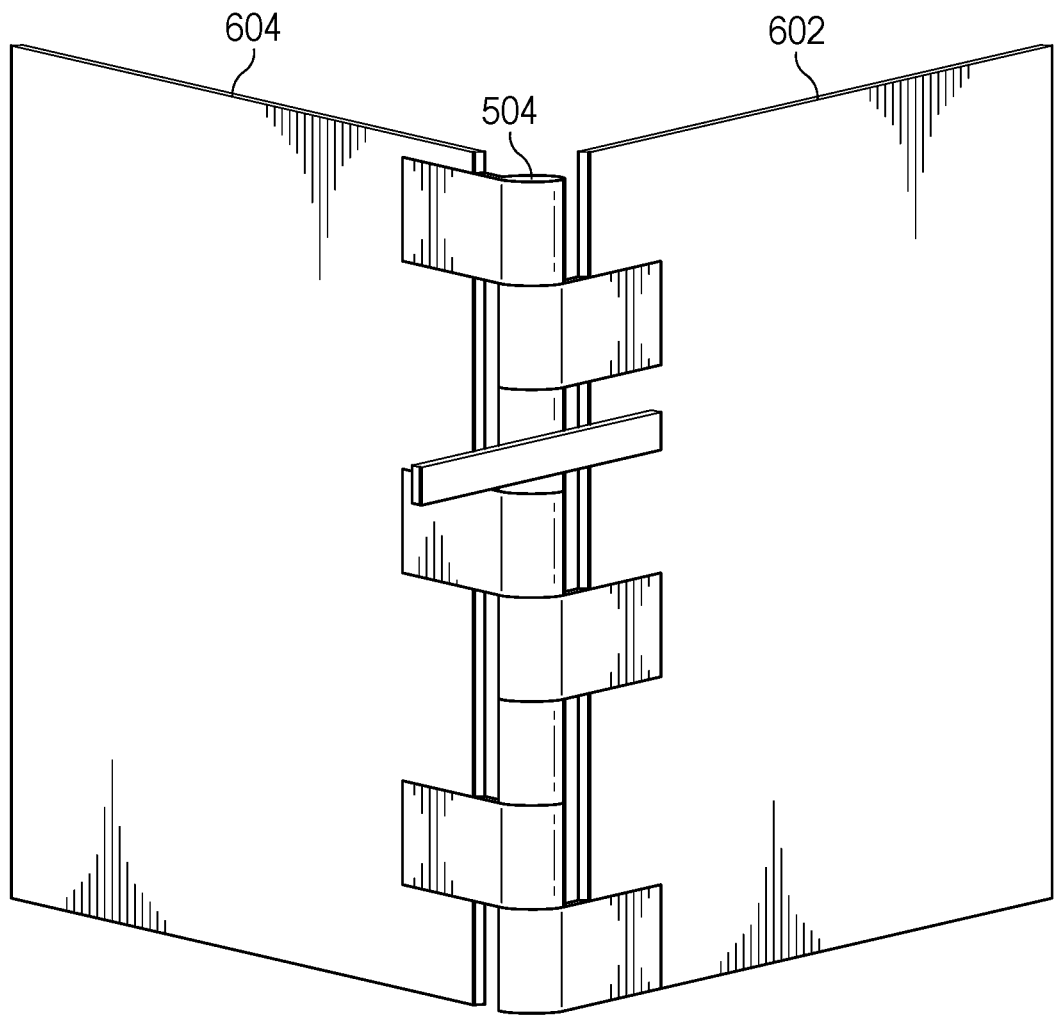
FIG. 6B depicts a pictorial diagram of the panels in a partially opened position in accordance with an illustrative embodiment.
Figure 6C:
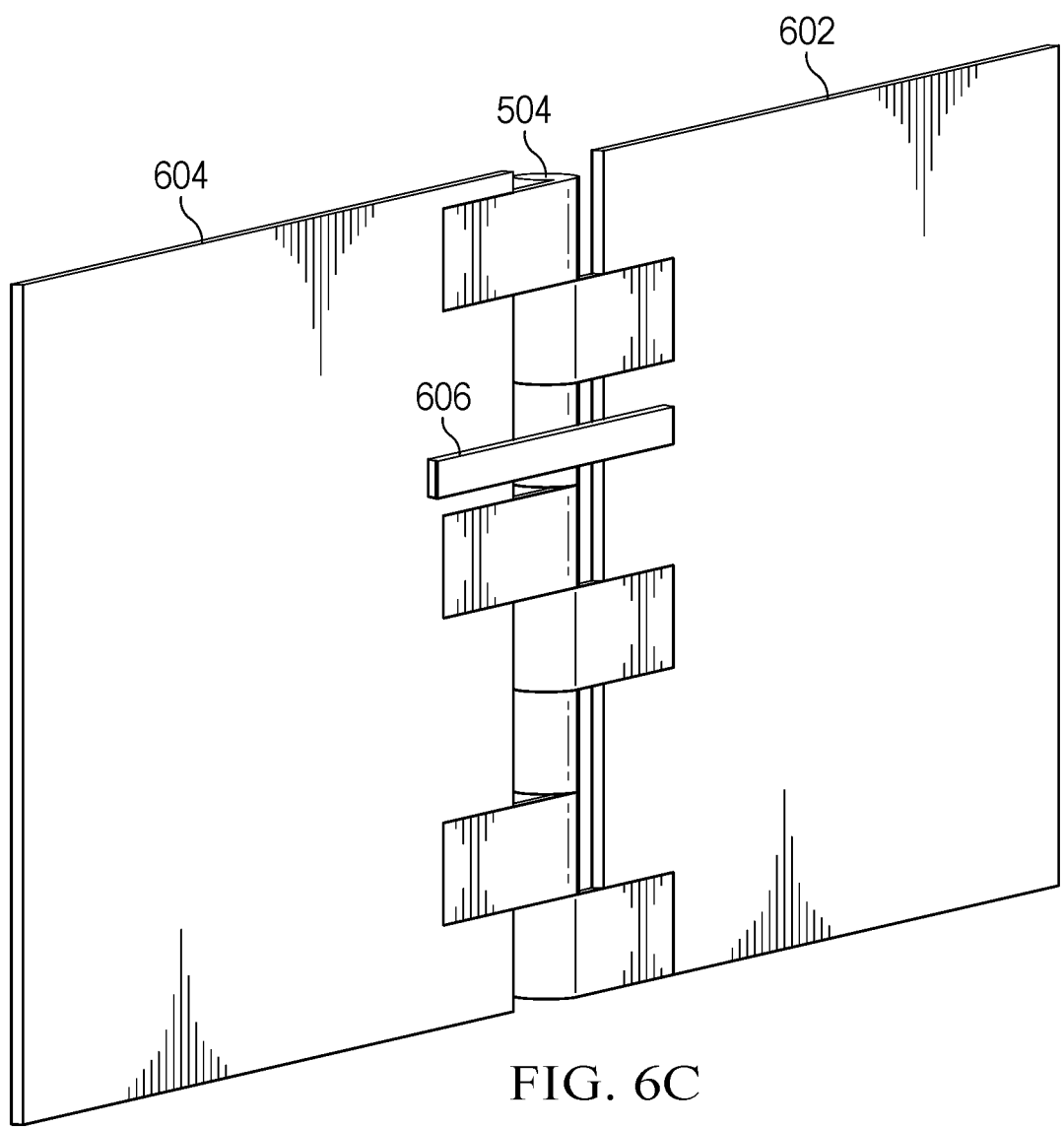
FIG. 6C depicts a pictorial diagram of the panels in a fully opened position in accordance with an illustrative embodiment.

FIGS. 6A-6C depict a sequence of pictorial diagrams illustrating the operation of the SMA spring-driven hinge 504 shown in FIG. 5 opening adjacent panels.

FIG. 6A depicts three SMA spring-driven hinges 504 connecting two panels 602, 604 in a folded position.

FIG. 6B depicts the panels 602, 604 in a partially opened position resulting from the heating and unwinding of the SMA springs inside the hinges 504 in response to electric current or an external thermal source.

FIG. 6C depicts the panels 602, 604 in a fully opened position. In this position, the warmed SMA springs have returned to the remembered shape and maintain preload against the hinges 504 to keep the panels 602, 604 in the deployed state. A hinge stop 606 attached to panel 602 provides a rotation constraint to ensure the panels 602, 604 remain coplanar and prevents the hinges 504 from overextending.

Figure 7A:
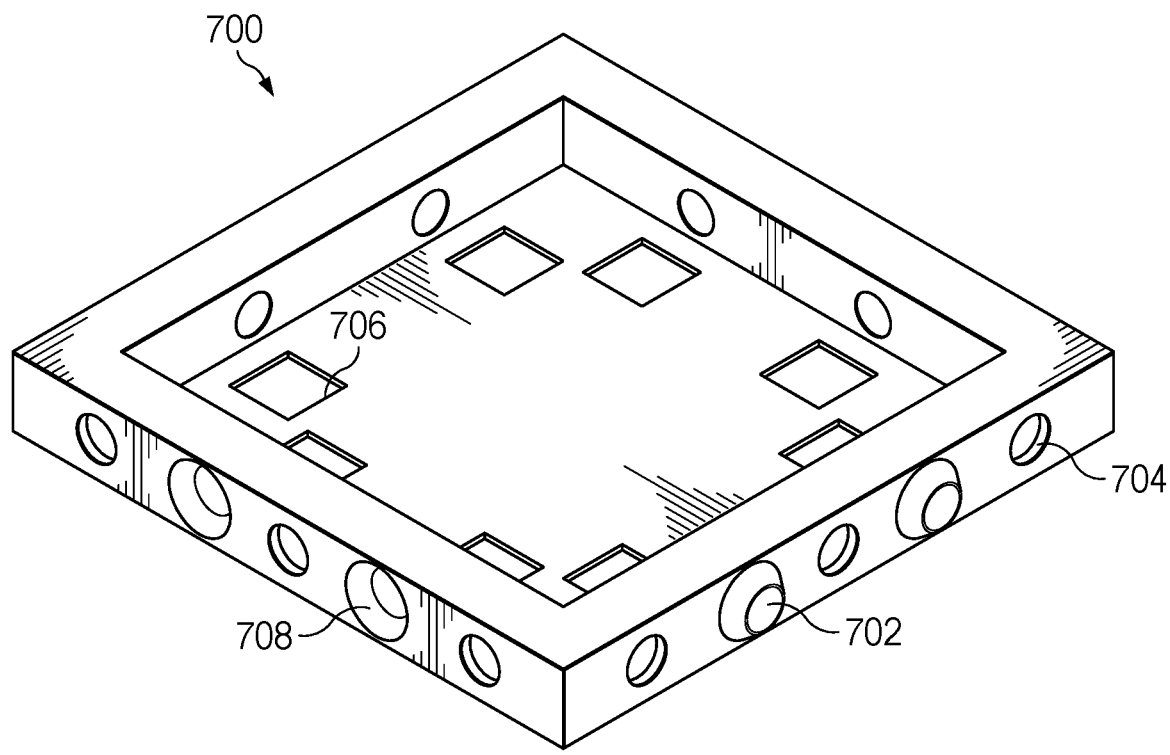
FIG. 7A depicts a perspective view pictorial diagram of a deployable subpanel in accordance with an alternate illustrative embodiment.
Figure 7B:
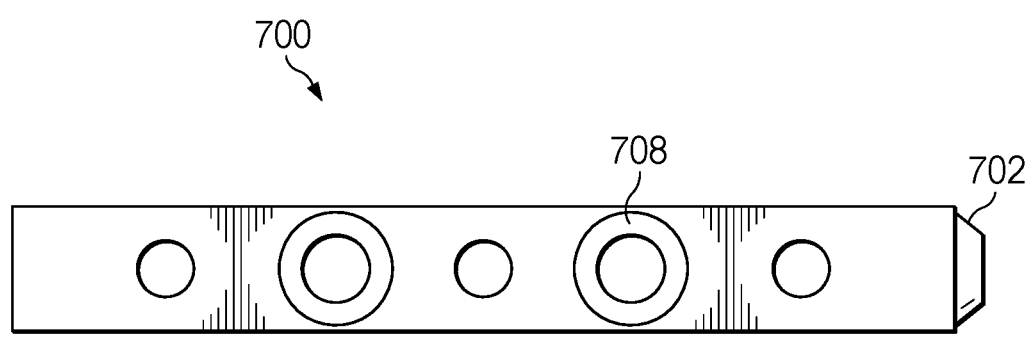
FIG. 7B depicts a side view pictorial diagram of the deployable subpanel in accordance with the alternate embodiment.

FIGS. 7A and 7B depict perspective and side view pictorial diagrams, respectively, of a deployable subpanel in accordance with another alternate embodiment.

This embodiment is suitable for deployments that require a seamless, extremely precise, deployed panel with no apparent hinges on the front or back side and the subpanels form one continuous, smooth surface without apparent seams or surface features. The precision of shape in the deployed panel is a product of the kinematic interface between panels. The kinematic interface is preloaded into the SMA's initial shape, which is "remembered" upon application of an electric current or external thermal source. Magnets can also be used to establish the precision of position of the deployed subpanels.

In this embodiment, SMA springs 710 act as both a hinge and tensile element. The SMA springs 710 can be mounted to contact points 706 inside the subpanel 700 and fed through hole in cones 702 or cone holes 708 and similarly connect with another subpanel at the other end. In the martinsitic, stowed state, the SMA hinges are both folded and lengthened.

Figure 8A:
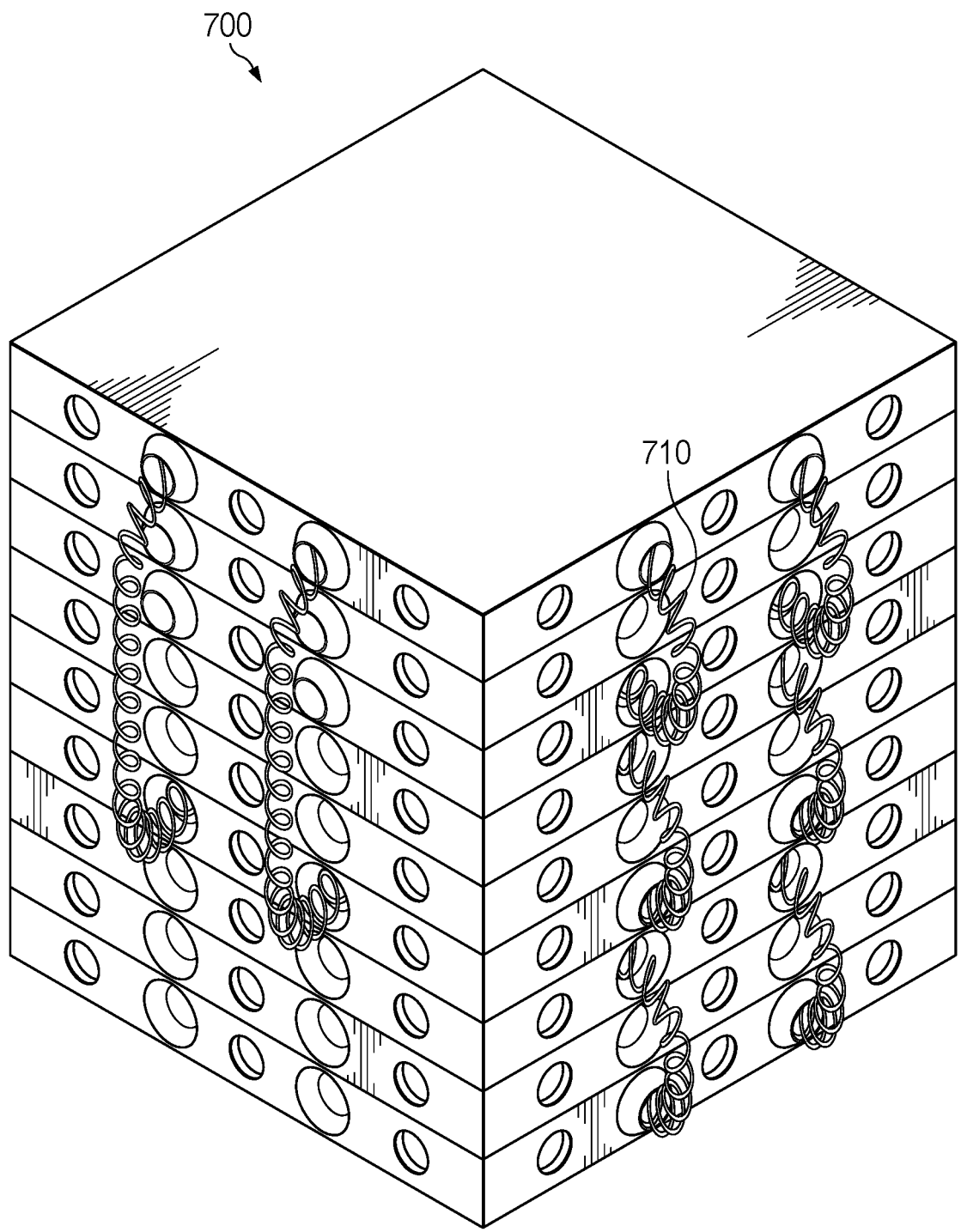
FIG. 8A depicts a pictorial diagram illustrating a deployable panel array using the spring hinge embodiment shown in FIGS. 7A and 7B in a folded position in accordance with an illustrative embodiment.
Figure 8B:
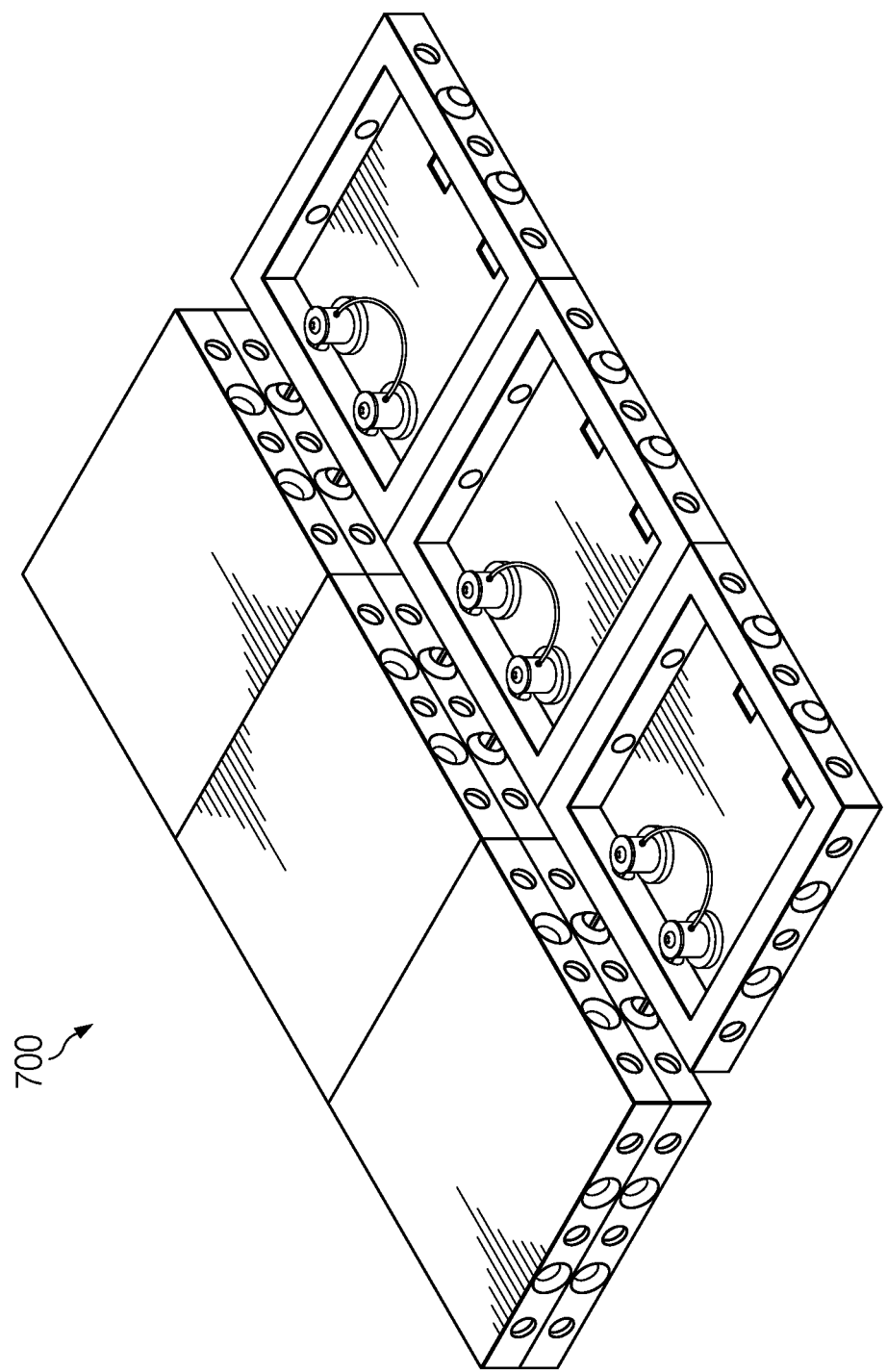
FIG. 8B depicts the deployable panel array in a partially unfolded position in accordance with an illustrative embodiment.
Figure 8C:
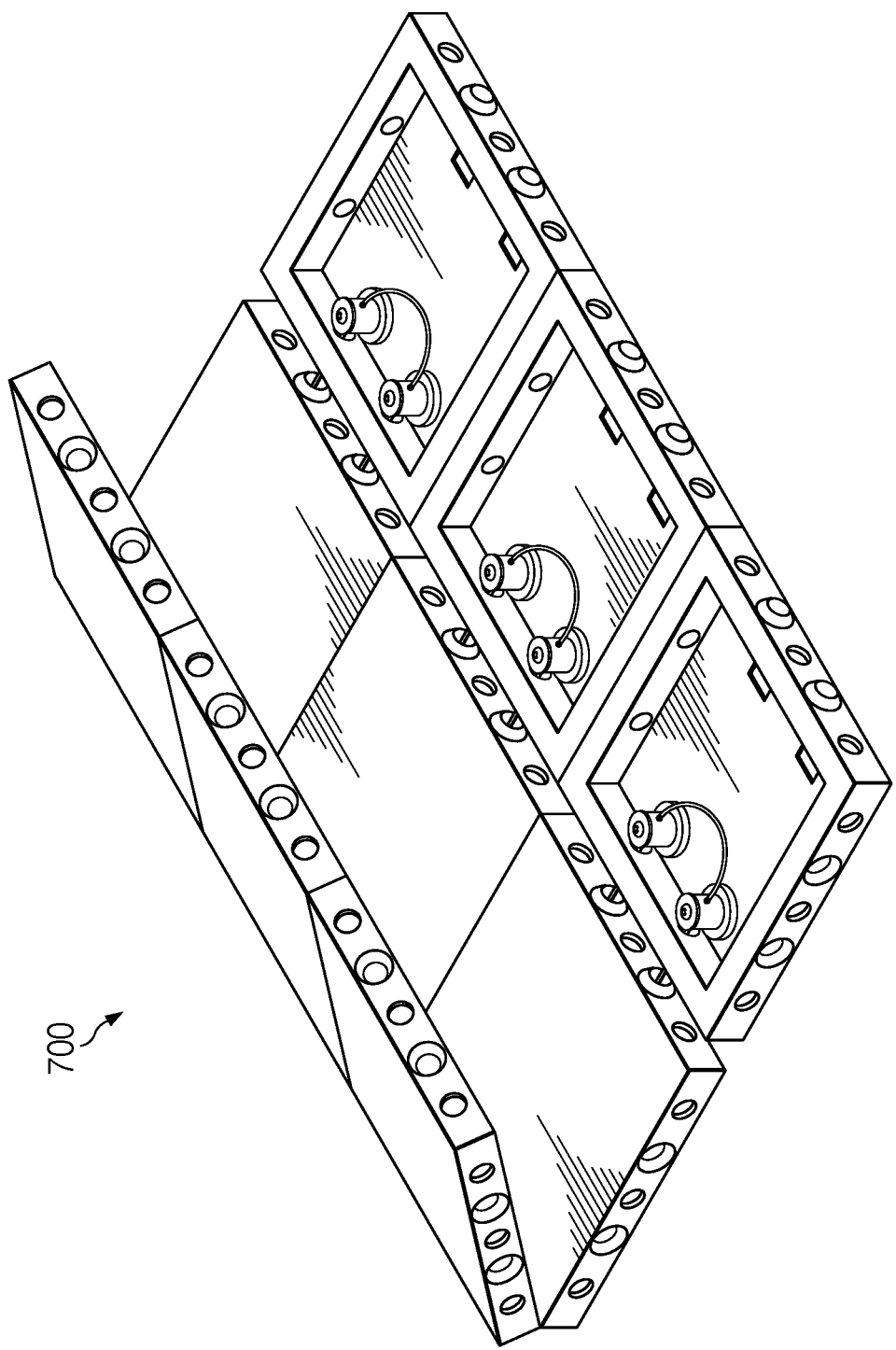
FIG. 8C depicts the deployable panel array in a further partially unfolded position in accordance with an illustrative embodiment.
Figure 8D:
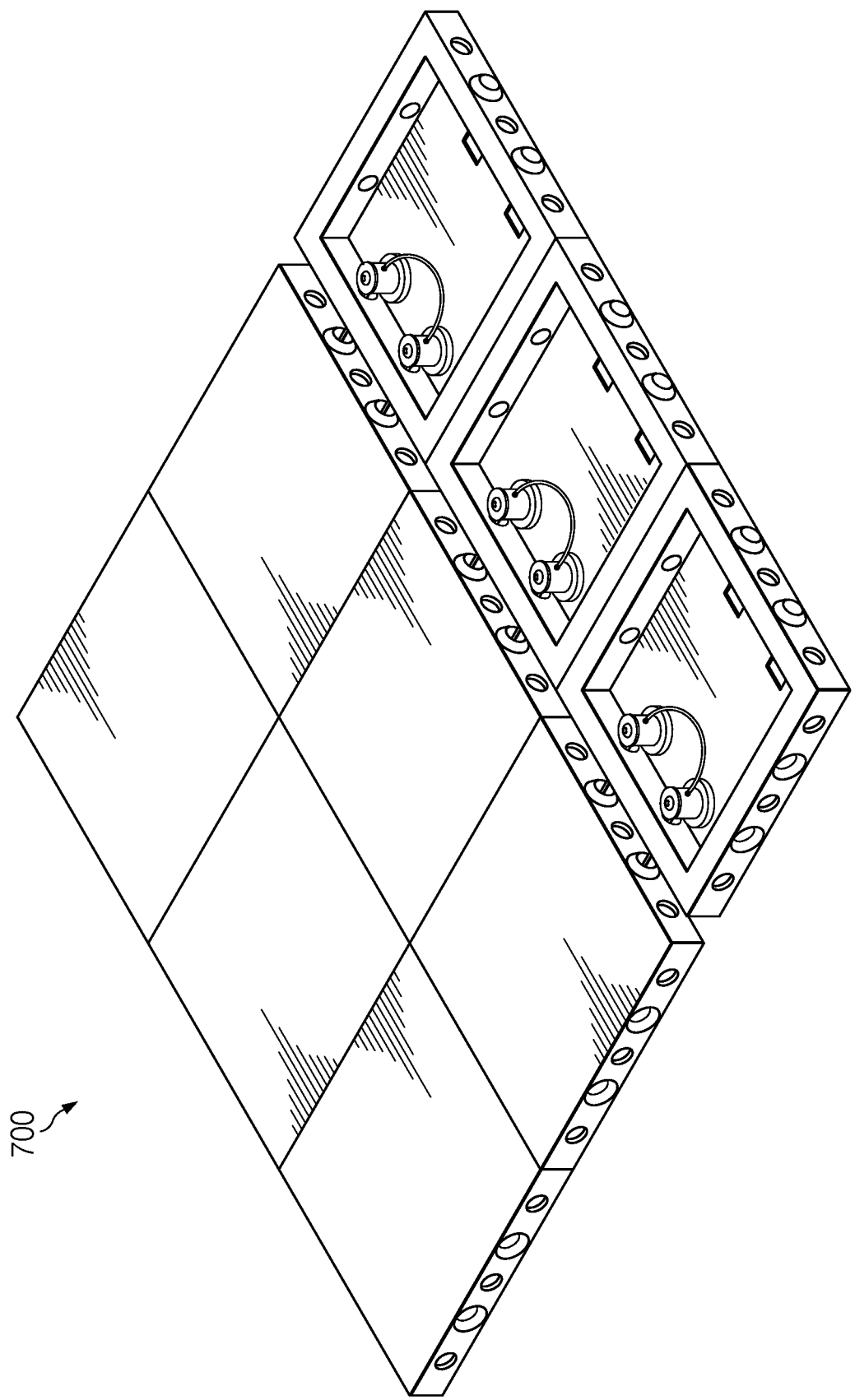
FIG. 8D depicts the deployable panel array in an unfolded, deployed position in accordance with an illustrative embodiment.

FIGS. 8A-8C depict a sequence of pictorial diagrams illustrating the deployment of an array of subpanels using the spring hinge subpanel embodiment shown in FIGS. 7A and 7B. The example shown in FIGS. 8A-8D comprises a nine-subpanel array analogous to deployable panel 200 in FIG. 2.

When an electric current is applied, the SMA springs 710 remember a straighter, shorter spring position and thereby both unfold the subpanels 700 and then apply tensile force to pull the gaps between subpanels shut. As with the embodiments described above, the unfolded position is trained into the SMA springs 710 to ensure precise kinematic mating between the subpanels when they are unfolded and pulled together as a unitary panel. Magnets 704 can be used in combination with the SMA preload to form one, seamless panel in the deployed position. The sequence shown in FIGS. 8A-8D illustrates the ability of the SMA to act as both a hinge and a motor without requiring a rotation constraint. In addition, an SMA such as nitinol acts as a conductor path (between the spring coils) for wiring/electrical interface between subpanels. The inner diameters of SMA hinges can act as conduits between subpanels (e.g., for wiring, electrical connections, fluid lines, etc.).

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A deployable panel, comprising:
a plurality of subpanels;
a number of shape memory alloy hinges connecting the subpanels together in respective pairs of the subpanels, wherein each subpanel of the subpanels is part of at least one pair of the respective subpanels, and
in each of the respective pairs:
the number of shape memory alloy hinges enable the subpanels in each respective pair to move between a first position in which the subpanels of the respective pair are folded over each other and a second position in which the subpanels of the respective pair are coplanar in response to a first energy source that changes a shape of the number of shape memory alloy hinges;
a number of shape memory alloy coil springs connected to a first subpanel of the subpanels of each of the respective pairs; and
a number of respective tethers connecting the shape memory alloy springs to the second subpanel of the respective pair, wherein the shape memory alloy springs contract in response to a second energy source to pull the first subpanel and second subpanel together end-to-end via the tethers.

2. The deployable panel of claim 1, further comprising magnets in adjacent ends of the first subpanel and second subpanel of each of the respective pairs to hold the first subpanel and second subpanel together end-to-end after the first subpanel and second subpanel of each of the respective pairs are pulled together by the shape memory alloy coil springs via the tethers.

3. The deployable panel of claim 1, further comprising a number of cones extending from an end of one of the subpanels of each of the respective pairs and corresponding cone holes in an end of the other subpanel of each of the respective pairs, wherein the cone holes are configured to accommodate the cones when the subpanels are pulled together by the shape memory alloy coil springs via the tethers.

4. The deployable panel of claim 3, wherein the tethers run through the cones and the cone holes.

5. The deployable panel of claim 1, wherein the subpanels are arranged in subsets of three subpanels, wherein a center subpanel in each respective subset is connected to the other subpanels of the subset via the respective tethers of the respective subset and the respective shape memory alloy hinges of the respective subset.

6. The deployable panel of claim 5, wherein the subsets of the three subpanels are connected to each other by second tethers and second shape memory alloy hinges connecting center subpanels of each of the subsets.

7. The deployable panel of claim 1, wherein the shape memory alloy hinges comprise graphene pads bonded to nitinol strips.

8. The deployable panel of claim 1, wherein the shape memory alloy hinges comprise graphene pads sandwiched between two nitinol strips.

9. A deployable panel, comprising:
nine subpanels arranged in a grid of three rows of three of the subpanels;
in each row of the three rows:
first nitinol hinges connecting the center subpanel of the respective row to each of the outside subpanels in the respective row, wherein the first nitinol hinges enable the outside subpanels in the respective row to move between a first, folded position in which the outside subpanels of the respective row are folded over the center subpanel of the respective row and a second, extended position in which each of the outside subpanels are coplanar with the center subpanel of the respective row in response to a first energy source that changes the shape of the first nitinol hinges; and
in the center row of the three rows:
second nitinol hinges connecting the center subpanel of the center row to the center subpanels of the other two rows of the three rows, wherein the second nitinol hinges enable the top row of the subpanels and the center row of subpanels to move between a third, folded position in which the center subpanel of the top row and the center subpanel of the center row are folded over the center subpanel of the bottom row of subpanels, and a fourth, extended position in which each of the center subpanels of the respective rows are coplanar in response to a second energy source that changes the shape of the second nitinol hinges.

10. The deployable panel of claim 9, further comprising:
in each row of the three rows:
first nitinol springs connected to each of the outside subpanels in the respective row; and
first tethers connecting each of the first nitinol springs to the center subpanel of the respective row, wherein the first nitinol springs contract in response to a third energy source to pull the outside subpanels and center subpanel in the respective row together end-to-end via the first tethers when the subpanels in the respective row are in the second, extended position;
in each of the top row and the bottom row:
second nitinol springs connected to the respective center subpanels of the top row and bottom row; and
second tethers connecting the second nitinol springs to the center subpanel of the center row, wherein the second nitinol springs contract in response to a fourth energy source to pull the center subpanels of each of the top row and the bottom row and the center subpanel of the center row together end-to-end via the second tethers when the center subpanels of the rows are in the fourth, extended position.

11. The deployable panel of claim 10, further comprising magnets in adjacent ends of the subpanels to hold the subpanels together after the subpanels are pulled together by the nitinol springs via the tethers.

12. The deployable panel of claim 10, further comprising:
first cones extending from inner ends of the outside subpanels of each row of the three rows;
corresponding first cone holes in opposite sides of the center subpanel of each row of the three rows, wherein the first cone holes are configured to accommodate the first cones when the subpanels in each row of the three rows are pulled together via the first tethers;
second cones extending from the a bottom end of the center subpanel of the top row;
corresponding second cone holes in a top end of the center subpanel of the center row configured to accommodate the second cones when the center subpanels are pulled together via the second tethers;
third cones extending from a bottom end of the center subpanel of the center row; and
corresponding third cone holes in a top end of the center subpanel of the bottom row configured to accommodate the third cones when the center subpanels are pulled together via the second tethers.

13. The deployable panel of claim 12, wherein the tethers run through the cones and the cone holes.

14. The deployable panel of claim 10, wherein the first nitinol hinges each comprise a graphene pad bonded to a nitinol strip.

15. The deployable panel of claim 10, wherein the second nitinol hinge each comprise a graphene pad sandwiched between two nitinol strips.

* * * * *

UNITED STATES PATENT AND TRADEMARK OFFICE
CERTIFICATE OF CORRECTION

PATENT NO. : 12,228,114 B1
APPLICATION NO. : 18/469599
DATED : February 18, 2025
INVENTOR(S) : Christopher R. Shurilla et al.

Page 1 of 1

It is certified that error appears in the above-identified patent and that said Letters Patent is hereby corrected as shown below:

In the Claims

Column 11, Line 19, correct "from the a bottom end" to read -- from a bottom end --

Signed and Sealed this
Eighteenth Day of March, 2025

Coke Morgan Stewart
*Acting Director of the United States Patent and Trademark Office*